US00RE38219E

(19) United States
(12) Reissued Patent
Lee et al.

(10) Patent Number: US RE38,219 E
(45) Date of Reissued Patent: Aug. 19, 2003

(54) MOLD-PRESSING DEVICE

(75) Inventors: Cheng Ho Lee, Taipei (TW); Cheng Nan Chen, Taipei (TW)

(73) Assignee: Waltjun Industrial, Inc., Taipei (TW)

(21) Appl. No.: 09/570,843

(22) Filed: May 12, 2000

Related U.S. Patent Documents

Reissue of:
(64) Patent No.: 5,749,278
Issued: May 12, 1998
Appl. No.: 08/874,554
Filed: Jun. 13, 1997

(51) Int. Cl.[7] ..... B26F 1/02
(52) U.S. Cl. ..... 83/588; 83/167; 83/633; 83/686; D19/72
(58) Field of Search ..... 83/167, 588, 633, 83/686; D19/72

(56) References Cited

U.S. PATENT DOCUMENTS

| | | | | |
|---|---|---|---|---|
| 1,150,179 A | | 8/1915 | Dom | |
| 1,692,764 A | | 11/1928 | Salt | |
| 2,449,108 A | | 9/1948 | Carlock | |
| 3,073,199 A | | 1/1963 | Yerkes | 83/549 |
| 3,368,441 A | * | 2/1968 | Piazze | |
| 3,385,152 A | | 5/1968 | Brown et al. | 83/633 |
| 3,459,084 A | | 8/1969 | Schlafly | 83/213 |
| 3,785,233 A | | 1/1974 | Robinson | 83/167 |
| 4,036,088 A | | 7/1977 | Ruskin | 83/167 |
| 4,713,995 A | | 12/1987 | Davi | 83/167 |
| 4,753,010 A | | 6/1988 | Franovich | 30/124 |
| 4,757,733 A | * | 7/1988 | Barlow | 83/588 |
| 5,163,350 A | | 11/1992 | Groswith, III et al. | 83/549 |
| 5,243,887 A | | 9/1993 | Bonge, Jr. | 83/54 |
| D373,385 S | | 9/1996 | Birkholz | 19/72 |
| 5,601,006 A | | 2/1997 | Quinn et al. | 83/588 |
| 5,658,421 A | | 8/1997 | Carroll | 156/513 |
| 5,697,278 A | * | 12/1997 | Shun-Yi | 83/588 |
| D393,657 S | | 4/1998 | Bennett | 19/72 |
| 5,778,750 A | | 7/1998 | Drzewiecki et al. | 83/628 |
| D409,630 S | | 5/1999 | Cornell et al. | 15/127 |
| 6,000,139 A | * | 12/1999 | Chan | |
| 6,089,137 A | * | 7/2000 | Lee | 83/686 |

* cited by examiner

*Primary Examiner*—James P. Mackey
*Assistant Examiner*—Joseph Leyson
(74) *Attorney, Agent, or Firm*—Sofer & Haroun, LLP

(57) ABSTRACT

A mold-pressing device including a seat body formed with a horizontal fissure at one end and a vertical chamber communicated with the fissure. A mold block is disposed in the chamber. One face of the mold block is disposed with a solid die, while the other face of the mold block is disposed with a channel passing through the mold block. A pressing lever is pivotally disposed in the channel of the mold block. A housing covers the seat body and is formed with a window for a pressing section of the pressing lever to extend therethrough. In use, a paper or a sheet is pushed into the fissure of the seat body and then the pressing section of the pressing lever is depressed, whereby a protuberance of the pressing lever is moved downward to force the mold block downward with the die punching the paper or the sheet placed in the fissure. Therefore, a product with a shape as that of the die is formed.

13 Claims, 3 Drawing Sheets

MOLD-PRESSING DEVICE

Matter enclosed in heavy brackets [ ] appears in the original patent but forms no part of this reissue specification; matter printed in italics indicates the additions made by reissue.

BACKGROUND OF THE INVENTION

The present invention relates to a mold-pressing device in which a mold block is movably disposed in a seat body. A pressing lever is pivotally disposed on the seat body for pressing the mold block. The seat body is formed with a fissure and the mold block is formed with a die. A paper or a sheet can be pushed into the fissure of the seat body and then the pressing section of the pressing lever is depressed, whereby the mold block is forced downward with the die punching the paper or the sheet placed in the fissure. Therefore, many products with a shape as that of the die can be formed.

Generally, when it is desired to manufacture a great amount of identical pictures, first many papers or sheets are stamped with a mold painted with ink. Then the pictures are cut off by a knife or a pair of scissors. Such procedure is very troublesome and waste-consuming. Alternatively, many papers can be stacked and cut off at one time to save time. However, in the case that the paper has a considerable thickness or the picture is too small, it will be hard to cut off the picture with smooth edges.

SUMMARY OF THE INVENTION

It is therefore a primary object of the present invention to provide a mold-pressing device including a seat body formed with a horizontal fissure and a vertical chamber communicated with the fissure. A mold block is disposed in the chamber. One face of the mold block is disposed with a solid die, while the other face of the mold block is disposed with a channel passing through the mold block. A pressing lever is pivotally disposed in the channel of the mold block. A housing covers the seat body and is formed with a window for a pressing section of the pressing lever to extend therethrough. In use, a paper or a sheet is pushed into the fissure of the seat body and then the pressing section of the pressing lever is depressed to force the mold block downward with the die punching the paper or the sheet placed in the fissure. Therefore, a product with a shape as that of the die is formed.

It is a further object of the present invention to provide the above mold-pressing device, in which a resilient member is fitted under the mold block in the chamber of the seat body. After the mold block is released from the pressing force of the pressing lever, the resilient member serves to restore the mold block to its home position.

It is still a further object of the present invention to provide the above mold-pressing device in which the mold block is replaceably placed in the seat body, whereby the mold block can be easily replaced by another mold block to manufacture different products.

The present invention can be best understood through the following description and accompanying drawings, wherein:

DETAILED DESCRIPTION OF THE PREFERRED EMBODIMENT

Figure 1:
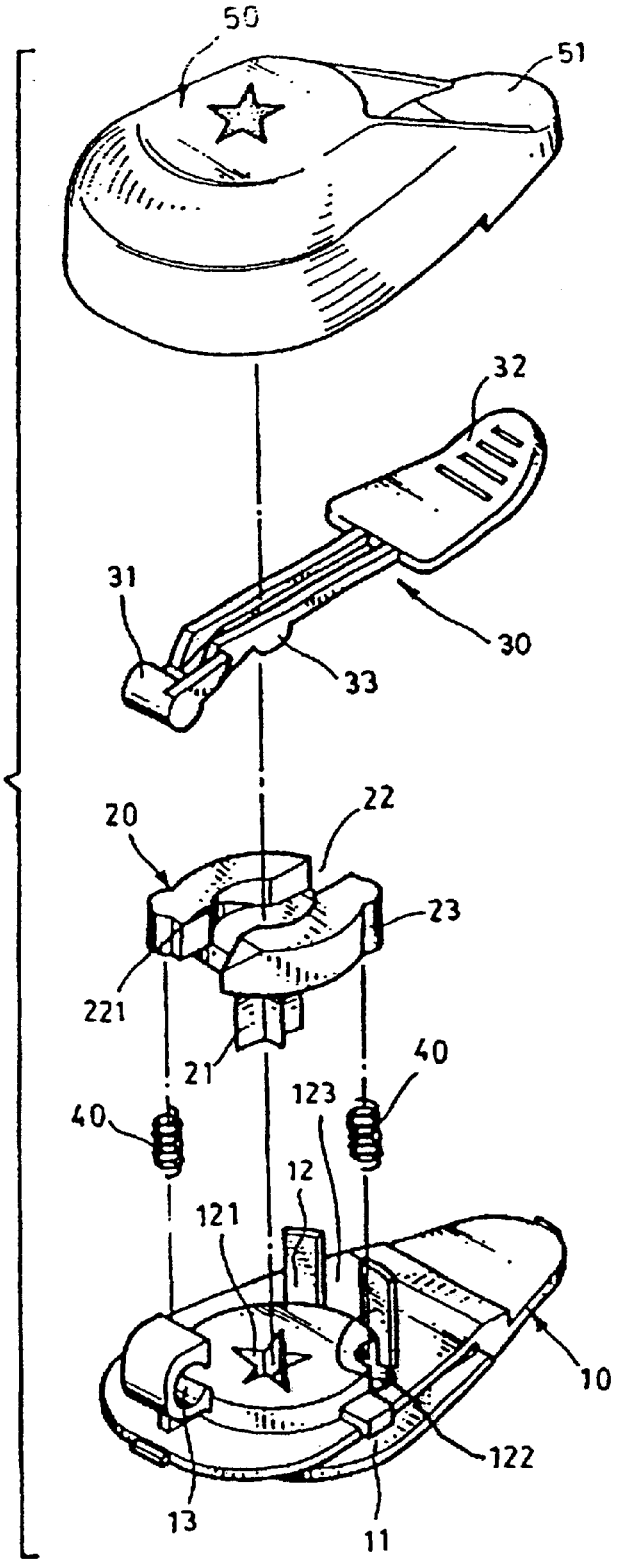
FIG. 1 is a perspective exploded view of the present invention.

Please refer to FIGS. 1 to 5. The mold-pressing device of the present invention includes a seat body 10 formed with a horizontal fissure 11 at one end and a vertical chamber 12. The bottom of the chamber 12 is formed with an opening 121 communicated with the fissure 11. An upward extension 122 is disposed on rear side of the chamber 12. A pair of opposite notches 123 are formed on the periphery of the chamber 12. An insertion cavity 13 is disposed in one notch 123 opposite to the other notch 123. The bottom of the seat body 10 is formed with a through hole 14 communicated with the fissure 11 opposite to the opening 121.

A mold block 20 is disposed on the seat body 20. One face of the mold block 20 facing the fissure 11 is disposed with a solid die 21 such as an animal or a cartoon picture. The other face of the mold block 20 is disposed with a channel 22 passing through the mold block 20. Two opposite recesses 221 are formed on two sides of the channel 22. The mold block 20 is disposed with a projection 23 corresponding to the extension 122 to be fitted therein.

A pressing lever 30 is disposed in the mold block 20. One end of the pressing lever 30 is disposed with a pivot shaft 31 for rotatably inserting in the insertion cavity 13 of the seat body 10, whereby the pressing lever 30 is pivotally disposed on the seat body 10. The other end of the pressing lever 30 is disposed with an upward bent pressing section 32. In a addition, the pressing lever 30 is formed with a protuberance 33 extending in a direction reverse to that of the pressing section 32 for fitting in the recesses 221 of the mold block 20.

At least one resilient member 40 is fitted under the projection 23 of the mold block 20. *As illustrated in FIG. 1 preferably two resilient members 40 where at least one resilient member 40 comprises first and second oppositely disposed springs adjacent to said die. The first spring is disposed along a second axis and the second spring disposed along a third axis, the third axis spaced apart from the first die axis and the second axis.*

Figure 2:
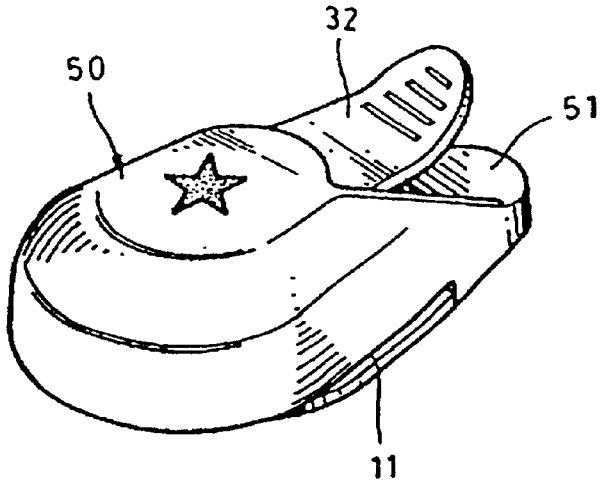
FIG. 2 is a perspective assembled view of the present invention.
Figure 3:
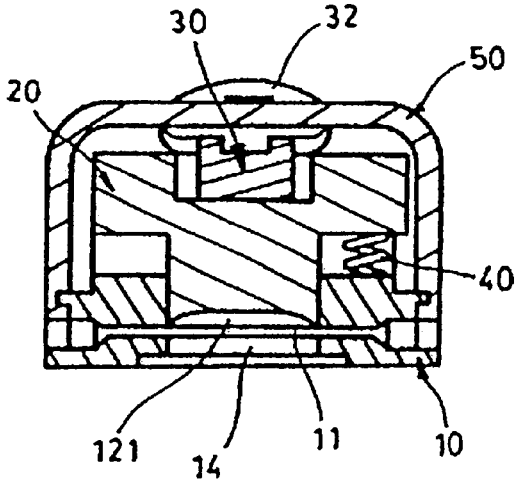
FIG. 3 is a front sectional view of the present invention, wherein the pressing lever is not pressed downward.
Figure 4:
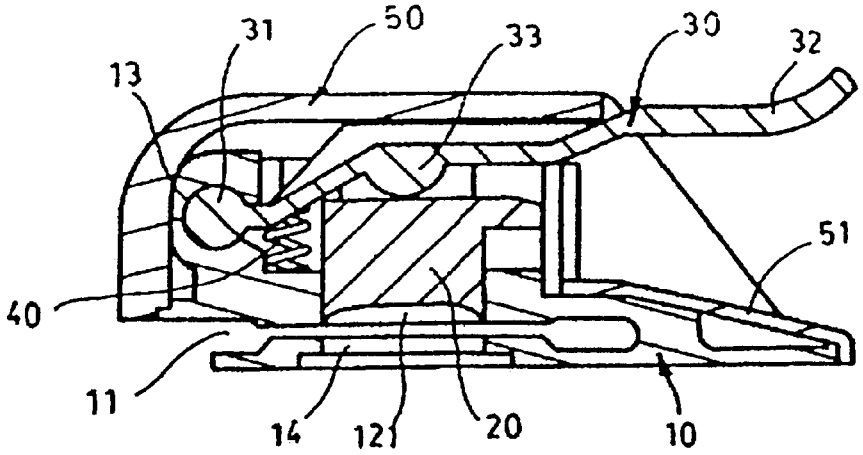
FIG. 4 is a side sectional view of the present invention, wherein the pressing lever is not pressed downward.

A housing 50 covers the seat body 10 and is formed with a window 51, whereby the pressing section 32 of the pressing lever 30 can extends through the window 51 out of the housing 50. *As illustrated in FIGS. 1 and 2, housing 50 preferably maintains an indication corresponding to the shape of die 21.*

Figure 5:
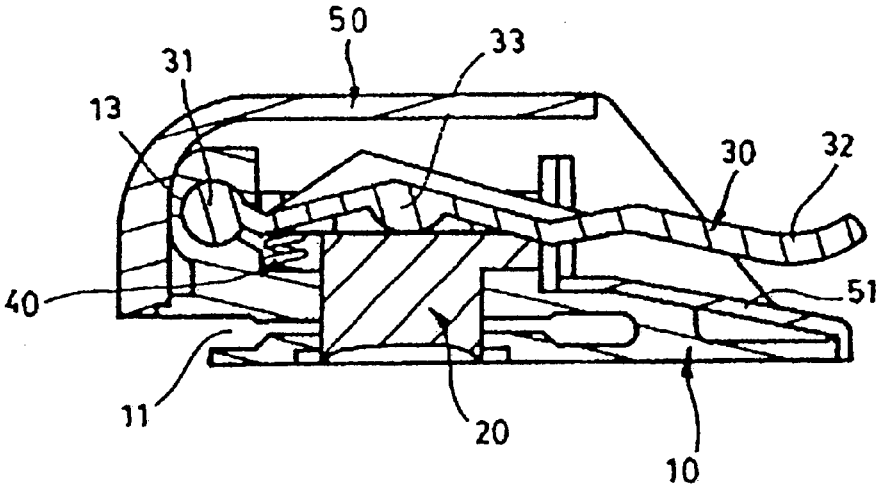
FIG. 5 is a side sectional view according to FIG. 4, wherein the pressing lever is pressed downward to punch the paper or the sheet.

In use, a paper or a sheet is horizontally placed in the fissure 11 of the seat body 10 and pushed inward to a true position. *Fissure 11 is maintained perpendicular to the movement axis of die 21.* Then the pressing section 32 of the pressing lever 30 is pivotally depressed about the pivot shaft 13, whereby the protuberance 33 of the pressing lever 30 is moved downward to exert a force onto the mold block 20. Accordingly, the mold block 20 is forced downward with the die 21 passing through the opening 121, *which maintains a shape corresponding to die 21,* of the chamber 12 to punch the paper or the sheet placed in the fissure 11. Therefore, a product with a shape as that of the die 21 is formed and moved along with the downward moving die 21 into the through hole 14 to drop outside as shown in FIG. 5. The resilient member 40 serves to restore the mold block 20 to its home position. At this time, the pressing section 32 of the pressing lever 30 is moved upward along with the mold block 21 to its home position. The above operation can be repeatedly performed to manufacture many products.

It is to be understood that the above description and drawings are only used for illustrating one embodiment of the present invention, not intended to limit the scope thereof. Any variation and derivation from the above description and drawings should be included in the scope of the present invention.

What is claimed is:

1. A mold-pressing device comprising:

a seat body formed with a horizontal fissure at one end and a vertical chamber, a bottom of the chamber being formed with an opening communicated with the fissure, a pair of opposite notches being formed on the periphery of the chamber, an insertion cavity being disposed in one notch opposite to the other notch, a bottom of the seat body being formed with a through hole communicated with the fissure opposite to the opening;

a mold block disposed on the seat body, one face of the mold block facing the fissure being disposed with a solid die, the other face of the mold block being disposed with a channel passing through the mold block;

a pressing lever disposed in the channel of the mold block, one end of the pressing lever being disposed with a pivot shaft for rotatably inserting in the insertion cavity of the seat body, whereby the pressing lever is pivotally disposed on the seat body, the other end of the pressing lever being disposed with an upward bent pressing section, the pressing lever being further formed with a protuberance extending in a direction reverse to that of the pressing section; and at least one resilient member fitted under the mold block in the chamber of the seat body.

2. A mold-pressing device as claimed in claim 1, wherein an outward extension is disposed on rear side of the chamber of the seat body, the mold block being disposed with a projection for fitting in the extension, the resilient member being fitted under the projection between the bottom of the chamber and the mold block.

3. A mold-pressing device as claimed in claim 1, wherein a housing covers the seat body and is formed with a window, whereby the pressing section of the pressing lever extends through the window out of the housing.

4. A mold-pressing device as claimed in claim 1, wherein the resilient member is a spring.

*5. A punch for punching a sheet of material, said punch comprising:*

*a body formed with a fissure for receiving the sheet of material, and a pivot shaft defining a pivot point;*

*a lever pivotably mounted about said pivot point of said pivot shaft;*

*a block positionable between said lever and said body, said block having a die moveable along a first axis, said block further comprising a channel configured to receive said lever; and*

*at least one resilient member adjacent to said die along a second axis spaced apart from said first axis, and disposed between said block and said body, wherein when said block is positioned between said lever and said body and when said lever is pivoted about said pivot point between a first position and a second position, said lever engages said block having said axially moveable die to punch the sheet of material.*

*6. The punch according to claim 5, wherein said at least one resilient member comprises first and second oppositely disposed springs adjacent to said die, said first spring disposed along said second axis and said second spring disposed along a third axis, said third axis spaced apart from said first and second axes.*

*7. The punch according to claim 5, wherein said fissure is substantially perpendicular to said first axis.*

*8. The punch according to claim 7, wherein said body has an opening which communicates with said fissure.*

*9. The punch according to claim 8, wherein said opening has a shape that corresponds to said die.*

*10. The punch according to claim 7, wherein said body has a pair of aligned openings which communicate with said fissure.*

*11. The punch according to claim 5, wherein said punch further comprises a housing which houses said block when positioned between said body and said lever.*

*12. The punch according to claim 11, wherein said lever extends through said housing.*

*13. The punch according to claim 11, wherein said housing provides an indication corresponding to a shape of said die.*

* * * * *